United States Patent [19]

Muir

[11] Patent Number: 4,822,502
[45] Date of Patent: Apr. 18, 1989

[54] IMIDAZOLINE PROMOTER OVERBASED CALCIUM SULFONATES

[75] Inventor: Ronald J. Muir, West Hill, Canada

[73] Assignee: NEC Corporation, Tokyo, Japan

[21] Appl. No.: 32,564

[22] Filed: Apr. 1, 1987

[51] Int. Cl.⁴ .................................... C10M 133/38
[52] U.S. Cl. .................................. 252/33.4; 252/47; 252/47.5; 252/48.2
[58] Field of Search .............. 252/33, 33.4, 47, 47.5, 252/48.2

[56] References Cited

U.S. PATENT DOCUMENTS

| | | | |
|---|---|---|---|
| 2,856,361 | 10/1958 | Schlicht | 252/33 |
| 3,189,542 | 6/1965 | Morway et al. | 252/33 |
| 3,470,097 | 9/1969 | Lavigne et al. | 252/33 |
| 3,492,230 | 1/1970 | Watson et al. | 252/33 |

*Primary Examiner*—Jacqueline V. Howard
*Attorney, Agent, or Firm*—Sughrue, Mion, Zinn, Macpeak, and Seas

[57] ABSTRACT

A composition and process for preparing an overbased calcium sulfonate, in which a specific class of compounds is employed as promoters in making overbased calcium sulfonates. These promoters give an enhanced efficiency of the conversion of lime to an oil-soluble dispersion of calcium carbonate. Low post-carbonation solids and high TBN (total base number of alkaline reserve) result from this improve promoter system. The process for preparing highly basic calcium sulfonate includes contacting an acidic gas at a temperature between 60° F. to 130° F., with a mixture of a sulfonic acid or calcium salt thereof, a hydrocarbon solvent, calcium hydroxide, a small quantity of co-promoter methanol, and up to 1.0% by weight of a compound with formula:

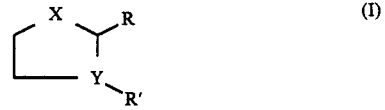

(I)

where
$X = O, S, =CH, -CH_2, -NH$ or $-N=$
$Y = O, N$ or $S$;
$R = H$ or, $C_1$ to $C_{50}$; and
$R' = H, CH_2CH_2OH,$ or $CH_2CH_2NH_2$ when $Y$ is $N$, and zero when $Y$ is $O$ or $S$.

The above membered cyclic rings can be saturated and unsaturated, and include as preferred compounds, imidazolines, oxazolines and pyrroles, and saturated and unsaturated analogs thereof.

17 Claims, No Drawings

IMIDAZOLINE PROMOTER OVERBASED CALCIUM SULFONATES

BACKGROUND OF THE INVENTION

1. Field of the Invention

A composition of matter and process for preparing highly basic calcium sulfonate, namely a process of manufacturing compositions containing an inorganic calcium salt and a calcium salt of an organic acid, in which the acid radical contains a sulfonic group.

2. Description of the Prior Art

Overbased calcium petroleum sulfonates are useful as additives for lubricting oils, particularly crankcase oils for internal combustion engines. These material impart detergency to lubricating oils and thus assist in keeping internal engine parts clean and reduce sludge formation in the oil. By increasing the alkaline reserve of the additive, equivalent detergency is obtained with a lower concentration of additive in the lubricating oil. Also, higher alkaline reserve neutralizes larger quantities of acidic combustion products which accumlate in the oil.

Alkaline reserve can be measured by total base number (TBN), which is the number of milligrams of potassium hydroxide equivalent to the amount of acid required to neutralize the alkaline constituents present in one gram of sample. A compound having a base number higher than can be obtained from the calcium petroleum sulfonate alone is said to be "overbased", sometimes referred to as "superbasic".

In explanation of the term "overbased calcium sulfonate", normal calcium sulfonate can be described by the formula $(RSO_3)_2Ca$ where $RSO_3-$ stands for the hydrocarbyl sulfonate radical. Since the number of hydrogen equivalents of calcium and of sulfonic acid moiety in normal calcium sulfonate is 2, the metal ratio in the normal calcium sulfonate is 1. Thus by the term "metal ratio" we mean the ratio equivalents of calcium to equivalents of sulfonic acid present in a particular mixture, e.g., in a readily filterable dispersion in the case of our mixture. When the metal ratio is greater than about 2, in a lubricating oil, the invention, when the number of equivalents of calcium is substantially greater than the number of equivalents of hydrocarbyl sulfonic moiety, then the composition is termed within our definition, as "overbased".

It is known in the sulfonate art, as exemplified by Griesinger, U.S. Pat. No. 2,402,325, Campbell et al., U.S. Pat. No. 2,485,861, and Mertes, U.S. Pat. No. 2,501,731, that a normal sulfonate or a sulfonic acid, particularly one derived from petroleum oils, can be combined with substantially more saltforming reagent or inorganic metal compound than is theoretically necessary to replace the acidic hydrogens of the acid. Essentially, the technique for obtaining such materials involves the use of a large excess of neutralizing agent or inorganic metal compound with either the normal sulfonate or sulfonic acid and water, and then dehydrating the process mass at elevated temperatures. While the exact composition of the product is not known, some researchers believe, on the basis of the Tyndall effect, that the excess metal present is due to a dispersion or colloidal suspension of the inorganic metal compound or neutralizing agent in the normal sulfonate. In any event, such compositions are known to possess a high metal content which cannot be explained in many instances by known basic salt structures. Perhaps the simplest metal content sulfonate complex which can be represented by a structural formula is:

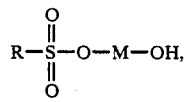

wherein M is a divalent metal and R is an organic radical. This sulfonate complex has a "metal ratio" of 2 (the metal ratio being, for the purpose of this specification and appended claims, the ratio of total equivalents of metal in the sulfonate complex to equivalents of sulfonic acid anion therein).

In the lubrication of internal combustion engines and other machinery, it has been found that the formation of sludge deposits is associated with the oxidation of the oil and is accelerated by various catalyst, particularly acids formed in the oil from oxidation or acids which are absorbed by the oil, e.g., from the combustion of sulphur and halogen compounds in internal combustion engines. It has also been found that if the acids are neutralized instantly, the rate of sludge formation can be greatly reduced, so that the useful life of the oil in the engine is extended far beyond that of the oil which is not protected by neutralizing agents. It has also been found that calcium carbonate is one of the most satisfactory neutralizing agents.

In order to utilize the valuable protective properties of calcium carbonate, it is necessary that it be dispersed in the oil in such a fine state of subdivision that it will not interfere with the operation of machinery in which the oil is employed as a lubricant. This necessitates that the prticle size be sufficiently small that the oil will be transparent to visible light and readily filterable through ordinary filtering media, such as filter paper. When larger particles are present in the oil, making the oil cloudy or murky, there is great danger that abrasion of bearing surfaces will result, and the coarse particles may even settle out of the oil on long standing.

A number of processes have been devised for preparing dispersions of calcium carbonate of the desirable characteristics hereinabove referred to. Most of these processes involve precipitation of the calcium carbonate from solutions of calcium salts in the presence of emsulifying agents, which act as peptizers to prevent agglomeration of the particles and coagulation of the emulsions. The most common dispersing and emulsifying agent is an oil soluble sulfonate. The calcium sulfonate employed may be prepared by the sulfonation of solvent refined lubricating oil distillate, followed by conversion of the sulfonic acids to calcium soaps. The molecular weight of the sulfonic acids was about 400 to 1000. They are preferentially oil soluble and commonly known as "mahogany" acids.

U.S. Pat. No. 3,126,340 granted to Sabol et al describes a process to prepare overbased calcium sulfonate whereby alkaline earth base, hydrocarbon solvent, 25% by volume of methanol, ammonia gas and carbon dioxide are employed to prepare calcium sulfonates with up to 300 TBN. According to that patent, $CO_2$ and $NH_3$ form an alkaline earth carbamate which is subsequently decomposed to the carbonate. This patent was one of the first to recognize the potential benefits of ammonia as a carbonation aid or promoter.

In U.S. Pat. No. 3,155,617, granted to Voorhees, certain water soluble organic acids are disclosed as slo-called "activators" for use in the preparation of overbased calcium sulfonates. When used in combination with other promoters, such as water or methanol, these acids, according to the patent, activate lime particles by destroying the surface carbonate coating on hydroxide molecules.

Alkyl phenols are disclosed as promoters in U.S. Pat. No. 3,172,855 granted to Noyes et al. These represent an unusual class of promoters, in that they are readily soluble in lubricating oils. Typically, most overbasing promoters are water soluble only.

In U.S. Pat. No. 3,856,687, granted to Lowe, it is disclosed that post formation additions of imidazoline polyalkoxylated compounds are desired as acid neutralizing accelerators in oils.

Prior art processes generally prevented the dispersion of crystalline carbonates during the process, by including a substantial excess of hydrated lime during processing, and by limiting the amount of carbon dioxide delivered during overbasing to between 0.4 to 0.8 mols $CO_2$ per mole hydrated lime. Illustrative processes where the $CO_2$ is limited to no more than 0.8 mols $CO_2$ per mole hydrated lime include U.S. Pat. No. 3,537,996 to Hoist et al and U.S. Pat. No. 4,165,291 to Gragson.

Previously known processes for overbasing calcium petroleum sulfonates have experienced difficulty in obtaining sufficiently high alkaline reserves, e.g., TBN of 300 mg KOH/gm or higher, to enable the formulator to use lower amounts of additive while maintaining equivalent detergency or to adequately protect the engine under conditions of high acid formation in the combustion process.

In summary, a considerable variety of processes exist to prepare overbased calcium sulfonates. The majority of these processes use alcohols and particularly methanol as promoters and generally in amounts greater than 10% of the batch yield.

SUMMARY OF THE INVENTION

1. Purpose of the Invention

It is an object of the present invention to provide an improved composition and process for preparing overbased calcium sulfonates.

A principal object of the present invention is to provide a composition and process as aforesaid in which certain cyclic compounds are used as promoters and co-promoters.

A further object is to provide such a composition and process, in which the novel promoters give an enhanced efficiency of the conversion of lime to an oil-soluble dispersion of calcium carbonate.

A further important object of the present invention is the minimization of the use of promoters.

An additional object is to provide a composition and process as aforesaid, in which lower post-carbonation solids and higher TBN (total base number of alkaline reserve) result from the improved promoter system.

Still another object is to provide such a process that produces very low cost reaction solids, and thereby generates less waste solids containing entrained calcium sulfonate, oil and process solvents, so that disposal of these post reaction solids in local landfill sites ceases to be a problem.

Still a further object is to prepare an overbased calcium petroleum sulfonate motor or lubricating oil additive having a high TBN.

Still an additional object is to provide a process whereby a desirably high TBN calcium petroleum sulfonate lubricating or motor oil additive can be prepared.

Other objects, in summary, include to provide a process for preparing high alkalinity alkaline earth metal-containing compositions. It is a more particular object of the present invention to provide a process for preparing overbased detergency addition agents for use in lubricants especially for use in liquid lubricants, e.g., for internal combustion engine crankcase applications. It is another object of this invention to provide overbased lubricating oil addition agents, as well as other high alkalinity compositions having dispersed alkaline earth metal content. Of course, another object is to provide lubricating oils containing overbased detergency addition agents.

In a more particular aspect, it is an object of this invention to provide an overbasing technique which especially increases calcium utilization in the overbasing procedure.

These and other objects and advantages of the present invention will become evident from the description which follows:

2. Brief Description of the Invention

The present invention entails a composition and process for preparing an overbased calcium sulfonate, in which a specific class of compounds is employed, which act as promoters in making overbased calcium sulfonates. These promoters give an enhanced efficiency of the conversion of lime to an oil-soluble dispersion of calcium carbonate. Lower post-carbonation solids and higher TBN (total base number of alkaline reserve) result from this improved promoter system. The process for preparing highly basic calcium sulfonate comprises contacting an acidic gas at a temperature between 60° F. to 130° F., with a mixture of a sulfonic acid or calcium salt thereof, a hydrocarbon solvent, calcium hydroxide, a small quantity of co-promoter $C_1$-$C_6$ alkanol, particularly including methanol, and up to 1.0% of a compound with the formula:

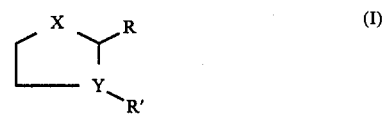 (I)

where
 $X = O, S, =CH, -CH_2, -NH$ or $-N$;
 $Y = O, N$ or $S$;
 $R = H$, or $C_1$ to $C_{50}$; and
 $R' = H, CH_2CH_2OH,$ or $CH_2CH_2NH_2$ when Y is N, and zero when Y is O or S.

Particularly preferred compounds include substituted imidazolines, substituted oxazolines and substituted pyrroles. The overbased calcium sulfonate product typically has a TBN of at least about 300, and is formed with less than about 8% total weight of promoters.

DESCRIPTION OF THE PREFERRED EMBODIMENTS

There has been discovered a specific class of cyclic compounds which, when present in the overbasing mixture in surprisingly extremely small amounts, significantly increases the carbonation reaction efficiency, and in so doing permits the preparation of overbased calcium sulfonates containing very few excess solids, that would subsequently otherwise require removal by filtration or centrifugation.

Chemically, these compounds can be described by the formula:

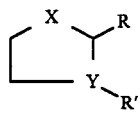

where
X=O, S,=CH, —CH$_2$, —NH or —N;
Y=O, N or S;
R=H or, C$_1$ to C$_{50}$; and
R'=H, CH$_2$CH$_2$OH, or CH$_2$CH$_2$NH$_2$ when Y is N, and zero when Y is O or S.

The above compounds may be saturated and unsaturated. Suitable compounds contemplated by this invention include substituted imidazolines, imidazoles, imidazolidines, substituted oxazolines, oxazoles, oxazolidnes and pyrroles. R is preferably C$_{18}$ to C$_{24}$.

Particularly preferred compounds include alkyl substituted imidazolines such as hydroxy ethyl oleyl imidazoline; amino ethyl oleyl imidazoline; hydroxy ethyl tall oil imidazoline; and amino ethyl tall oil imidazoline.

The type of carbonate formed during the carbon dioxide overbasing step is important. In order to have an overbased sulfonate soluble in mineral oil, it is important that the metal carbonate exist in the amorphous form. Generally, it has been found that if crystalline metal carbonates are incorporated into the overbased sulfonate in any significant quantity, the mineral oil solubility characteristics are poor. In addition to its amorphous form, calcium carbonates can be found in three crystalline varieties, calcite, vaterite and aragonite. Since the primary use of products of this invention are lubricating oil additives, it is a necessary requirement that the overbased sulfonate be solubel in mineral oil, therefore no crystalline carbonates can be tolerated.

For economic reasons, it is highly desirable to commercially operate, a process that produces very low post reaction solids, particularly when one considers that these waste solids contain some entrained calcium sulfonate, oil and process solvents. It is also becoming increasingly difficult to dispose of these post reaction solids in local landfill sites, thus placing an even greater requirement that the process be as efficient as possible.

One principal key to the present invention lies in the recognition of a specific novel combination of promoters or catalysts, wherein a first promoter is an aliphatic alcohol generally containing one to four carbon atoms or C$_1$ to C$_6$ alkanol, with the preferred alcohol being methanol, and a small but significant amount of;

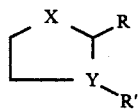

where
X=O, S,=CH, —CH$_2$, —NH or —N;
Y=O, N or S;
R=H or, C$_1$ to C$_{50}$; and
R'=H, CH$_2$CH$_2$OH, or CH$_2$CH$_2$NH$_2$ when Y is N, and zero when Y is O or S.

The promoter system of the present invention ie exceptional when one realizes that the cyclic promoter (e.g. imidazoline) need be present in only up to 1%, or specifically 0.1 to 1.0%, by weight, and yet produce a TBN 300 overbased calcium sulfonate.

This invention describes a process that permits a full carbonation of available lime, and in so doing results in a crude overbased mixture that contains very few excess solids that require removal by filtration or centrifugation. This is achieved by the above mentioned combination of promoters, and within prescribed reaction conditions.

Thus, the present invention is characterized by the provision, in one embodiment, of a process for preparing an overbased calcium sulfonate including the steps of; providing a sulfonic acid; charging the sulfonic acid to a reactor; adding calcium hydroxide or calcium oxide to the reactor for neutralization and overbasing; adding a lower aliphatic alcohol, a hydrocarbon solvent, and a compound of Formula I to the reactor, to form a process mixture within the reactor; adjusting the temperature of the process mixture to a reaction temperature in the range of about 60° F. to 130° F.; injecting carbon dioxide into the reactor, until substantially all of the lime has been carbonized to calcium carbonate, while maintaining the temperature in the reactor below 130° F.; adding a quantity of oil to the reacted mixture, to form a product mixture; clarifying the product mixture; and distilling off volatile hydrocarbon solvents and water, so that a bright, clear overbased calcium sulfonate is formed, in which substantially all of the calcium carbonate is present in its amorphous form.

The initial sulfonic acid may encompass and include a calcium salt of a sulfonic acid. The lime reactant may encompass hydrated lime in the form of calcium hydroxide. Typically, the lower aliphatic alcohol reactant may be an alcohol selected from the group consisting of alkanol and alkoxyalkanol of from 1 to 6 carbons, and in a preferred embodiment the lower aliphatic alcohol is methanol, albeit ethanol, propanol, butanol, pentanol or hexanol may be employed in suitable instances. The petroleum hydrocarbon solvent includes, by way of example; naphtha, benzene, toluene, xylene, heptane and hexane.

Preferably, the reaction temperature in the reactor is maintained below about 120° F., and usually in the range of about 80° F. to 110° F. Typically, the reaction temperature is initially adjusted to about 80° F.

The quantity of C$_1$ to C$_6$ alkanol or lower aliphatic alcohol added to the reaction mixture is such that the amount of the total promoter is less than about 8% by weight of the yield of finished product formed in the last step of the process. The C$_1$ to C$_6$ alkanol is present in the range of about 3% to 4%, and usually about less than 4%, of the total reaction mixture.

The process of the present invention requires less than 10% and preferably less than 5% by weight of total promoters, whereas the prior art processes usually required 15% to 20% or greater amounts of promoters. As stated, the alkanol or aliphatic alcohol is preferably present in an amount of 3% to 4% by weight, while the cyclic promoter is generally present in an amount of 0.05% to 1.0% by weight, and most preferably 0.1% to 0.7% by weight.

Another important aspect is that the CO$_2$ may be present in an amount of 1 mole CO$_2$ per mole of lime.

The following Examples are illustrative of the invention:

EXAMPLES

A sulfonic acid is charged to a reactor, followed by calcium hydroxide (for neutralization and overbasing), methanol, hydrocarbon solvent, and promoter compound of formula I. The temperature of the mixture is adjusted to about 80° F., and $CO_2$ is injected until all of the lime has been carbonated. The temperature was maintained below 120° F. throughout the carbonation. Upon completion of the carbonation, the desired quantity of oil is added, and the product clarified by centrifugation or filtration. Finally, volatile hydrocarbon solvents and water are distilled off, leaving a bright, clear overbased calcium sulfonate in which all the calcium carbonate is present in its amorphous form.

While the process is simple and straightforward in procedure, there are several important aspects that must be carefully considered. The carbonation temperature should be maintained below 120° F., with the preferred temperature range being 80° F.–110° F., primarily because higher temperature carbonations can lead to a dispersion of crystalline carbonates in the overbased sulfonates, in turn resulting in reduced oil solubility. The results in Table I below, substantiate this statement.

TABLE I
EFFECT OF CARBONATION TEMPERATURE ON DISPERSION QUALITY

| Temperature of Carbonation (°F.) | Carbonate Type Dispersed (Infra Red) | Solubility in Bright Stock | Nephelos Value on Product |
|---|---|---|---|
| 80–90 | amorphous | excellent | 23 |
| 90–100 | amorphous | excellent | 24 |
| 100–110 | amorphous | excellent | 23 |
| 110–120 | amorphous | excellent | 25 |
| 130–140 | amorphous + calcite | slightly hazy | 48 |
| 140–150 | amorphous + calcite + vaterite | hazy | 95 |
| 150–160 | calcite + vaterite | cloudy | off scale |

Another important aspect of this process concerns the polar solvent content of the overbasing mixture. The amount present must be insufficient to cause a dispersion of crystalline carbonates within the overbased sulfonate. This is accomplished by limiting the quantity of methanol to no more than about 8.0% of the yield of finished product or generally about 3%–4% of the total reaction mixture. In Table II, the effect observed by varying the quantity of methanol present during carbonation is tabulated. In each experiment in Table II, 0.3% of an alkyl imidazoline is included as the reaction promoter.

TABLE II
EFFECT OF METHANOL QUANTITY ON PRODUCT CLARITY AND REACTION EFFICIENCY

| % Methanol (based on yield of product) | Mols $CO_2$ delivered/ per mol lime | Carbonate Type (via I.R.) | TBN | Product Clarity |
|---|---|---|---|---|
| 1.0 | 0.95 | Amorphous | 135 | bright & clear |
| 2.0 | 0.95 | Amorphous | 275 | bright & clear |
| 3.0 | 0.95 | Amorphous | 305 | bright & clear |
| 4.0 | 0.95 | Amorphous | 304 | bright & clear |
| 5.0 | 0.95 | Amorphous + v. slight calcite shoulder | 304 | v. slight haze |
| 6.0 | 0.95 | Calcite/Vaterite | 280 | cloudy |
| 7.0 | 0.95 | Calcite | 275 | cloudy |

The inventive and comparative runs in Table III demonstrate the criticality of the presence of the cyclic promoter (e.g. an alkyl imidazoline) during overbasing. The quantity of promoter present can be extremely small, 0.1% or less being an amount sufficient to observe increased carbonation efficiency, as shown by a reduction in filterable solis (as % post carbonation sediment i.e. PCS), and an increase in product TBN.

TABLE III
EXAMPLES USING AN ALKYL IMIDAZOLINE AS REACTION PROMOTER

| % Alkyl Imidazoline | % Methanol | % Post Carbonation Sediment (% PCS) | TBN |
|---|---|---|---|
| Nil | 2.5 | 7.2 | 235 |
| Nil | 3.5 | 6.2 | 247 |
| 0.1 | 2.5 | 5.2 | 289 |
| 0.2 | 2.5 | 4.5 | 306 |
| 0.3 | 3.5 | 2.8 | 326 |
| 0.5 | 3.5 | 1.7 | 327 |
| 0.7 | 3.5 | 1.5 | 319 |
| 1.0 | 4.0 | 1.2 | 303 |

Table IV identifies a number of cyclic promoter compounds useful in this process, by including in the reaction mixture 0.3% of each respective promoter, 3.5% methanol as additional or copromoter, and delivering 1 mole $CO_2$ per mole lime, and by carbonating at a temperature between 90° F.–115° F.

TABLE IV
ILLUSTRATIVE PROMOTORS

| | Descriptive Name | Structure | % Post Carbonation Sediment | TBN |
|---|---|---|---|---|
| (1) | Alkyl Imidazoline | (structure shown) | 1.3 | 326 |
| (2) | Alkyl Oxazoline | (structure shown) | 3.2 | 304 |
| (3) | Imidazole | (structure shown) | 2.0 | 339 |
| (4) | Pyrrole | (structure shown) | 2.6 | 319 |
| (5) | Thiophene | (structure shown) | 3.0 | 310 |

TABLE IV-continued
ILLUSTRATIVE PROMOTORS

| Descriptive Name | Structure | % Post Carbonation Sediment | TBN |
|---|---|---|---|
| (6) No additive | — | 9.1 | 235 |

As shown, the number of compounds useful in the process is considerable, however, some compounds are more desirable than others and these preferred compounds include imidazoles, alkyl imidazolines and alkyl oxazolines.

It thus will be seen that there is provided a composition of matter and a process for preparing overbased calcium sulfonates which attain the various objects of the invention, and which are well adapted for the conditions of practical use. As numerous alternatives within the scope of the present invention will occur to those skilled in the art, besides those alternatives, embodiments, variations and equivalents mentioned, it will be understood that the invention is not to be limited to such alternatives or the like, but extends fully to all such equivalents and alternatives which may occur to those skilled in the art, and is to be limited solely by the scope of the appended claims, and functional and structural equivalents thereof.

What is claimed is:

1. A promoter for and with an overbased calcium sulfonate comprising; a cyclic compound present in an amount of up to 1.0% of the overbased calcium sulfonate, and having the formula:

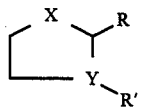
(I)

where
Y=O, N or S;
R=H or, $C_1$ TO $C_{50}$; and
R'=H, $CH_2CH_2OH$, or $CH_2CH_2NH_2$ when Y is N, and zero when Y is O or S.

2. The promoter of claim 1, wherein R is a $C_{18}$–$C_{24}$ alkyl group.

3. The promoter of claim 1, further comprising a $C_1$–$C_6$ alkanol co-promoter.

4. The promoter of claim 1, wherein the total weight of promoter and co-promoter is less than about 8% of the overbased calcium sulfonate, and the overbased calcium sulfonate has a TBN of at least about 300.

5. The promoter of claim 1, said cyclic compound being one selected from saturated and unsaturated compounds.

6. The promoter of claim 5, said cyclic compound being one selected from imidazolines, oxazolines, pyrroles and analogs thereof.

7. The promoter of claim 6, further comprising a $C_1$ to $C_6$ alkanol co-promoter.

8. The promoter of claim 7, wherein the total weight of promoter and co-promoter is less than about 8% of the overbased calcium sulfonate, and wherein the overbased calcium sulfonate has a TBN of at least about 300.

9. A process for preparing an overbased calcium sulfonate comprising:
   (a) providing a mxiture comprising a sulfonic acid or calcium salt thereof, a hydrocarbon solvent, calcium hydroxide or calcium oxide, a $C_1$ to $C_6$ alkanol, and as a promoter, a cyclic compound having the formula;

(I)

where
X=O, S,=CH, —$CH_2$, —NH or —N=;
Y=O, N or S;
R=H or, $C_1$ to $C_{50}$; and
R'=H, $CH_2CH_2OH$, or $CH_2CH_2NH_2$ when Y is N, and zero when Y is O or S,
   (b) contacting said mixture with an acidifying material at a temperature between 60° F. to 130° F. to form the product overbased calcium sulfonate, and wherein the cyclic compound is present in an amount of up to about 1.0% by weight of the product yield.

10. The process of claim 9, wherein the product overbased calcium sulfonate has a TBN of at least about 300.

11. The process of claim 10, wherein the total weight of the alkanol and cyclic promoter compound is about 8% of the product sulfonate.

12. The process of claim 11, said cyclic promoter compound being an alkyl imidazoline.

13. The process of claim 9, wherein the alkanol is present in an amount of less than about 4%.

14. The process of calim 13, wherein the cyclic compound is present in an amount of up to about 1.0%.

15. An overbased calcium sulfonate comprising; an overbased calcium sulfonate comprising a cyclic promoter having the formula:

(I)

where
X=O, S,=CH, —$CH_2$, —NH or —N=
Y=O, N or S;
R=H or, $C_1$ $C_{50}$; and
R'=H, $CH_2$, $CH_2OH$, or $CH_2CH_2NH_2$ when Y is N, and zero when Y is O or S,
wherein the cyclic promoter is present in an amount up to about 1.0% by weight of the calcium sulfonate.

16. The overbased calcium sulfonate of claim 15, said sulfonate having a TBN of at least about 300.

17. The overbased calcium sulfonate of claim 16, said promoter being one selected from an imidazoline, oxazoline and pyrrole and an analog thereof.

* * * * *

UNITED STATES PATENT AND TRADEMARK OFFICE
CERTIFICATE OF CORRECTION

PATENT NO. : 4,822,502
DATED : Apr. 18, 1989
INVENTOR(S) : Ronald J. Muir, West Hill, Canada It is certified that error appears in the above-identified patent and that said Letters Patent is hereby corrected as shown below:

On the title page:
After "[73] Assignee:", delete "NEC Corporation, Tokyo, Japan" and insert -- Witco Corp., New York, New York --.

After "Attorney, Agent, or Firm", delete "Sughrue, Mion, Zinn, Macpeak, and Seas" and insert -- Marvin Feldman --.

Signed and Sealed this

Twenty-fourth Day of April, 1990

Attest:

HARRY F. MANBECK, JR.

*Attesting Officer*  *Commissioner of Patents and Trademarks*